United States Patent
Dinlocker

[15] 3,637,241
[45] Jan. 25, 1972

[54] FABRICATION TECHNIQUE FOR ELECTRICAL DEVICES

[72] Inventor: Robert I. Dinlocker, Lansdale, Pa.

[73] Assignee: Electro-Mechanical Instrument Company, Inc.

[22] Filed: Feb. 6, 1970

[21] Appl. No.: 9,215

Related U.S. Application Data

[63] Division of Ser. No. 563,001, June 15, 1966, Pat. No. 3,510,773, which is a continuation-in-part of Ser. No. 322,476, Nov. 8, 1963

[52] U.S. Cl.................................................287/20.3, 24/73
[51] Int. Cl.................................................................F16b 9/00
[58] Field of Search..................287/203; 24/73 B; 339/220, 339/221, 217 S; 248/216; 324/146

[56] References Cited

UNITED STATES PATENTS

| | | | |
|---|---|---|---|
| 2,110,035 | 3/1938 | Chirelstein | 339/221 X |
| 2,497,484 | 2/1950 | Wood | 339/221 |
| 2,551,970 | 5/1951 | Sampson | 339/217 S X |
| 2,924,807 | 2/1960 | Field | 339/217 S X |
| 3,147,086 | 9/1964 | Batcheller et al. | 24/73 B X |
| 3,196,377 | 7/1965 | Minich | 339/217 S X |
| 3,200,332 | 8/1965 | Pfeffer | 324/146 |
| 3,510,773 | 5/1970 | Dinlocker | 324/146 |

Primary Examiner—Andrew V. Kundrat
Attorney—Woodcock, Washburn, Kurtz & Mackiewicz

[57] ABSTRACT

In the fabrication of sheet metal devices, particularly electrical components, a bracket has a main body portion from which a pair of legs extend. The pair of legs extend through slots in a housing and are deformed to rigidly secure the bracket to the housing. Notches in opposite sides of each leg limit the deformation so the deformation does not extend to the body portion.

6 Claims, 11 Drawing Figures

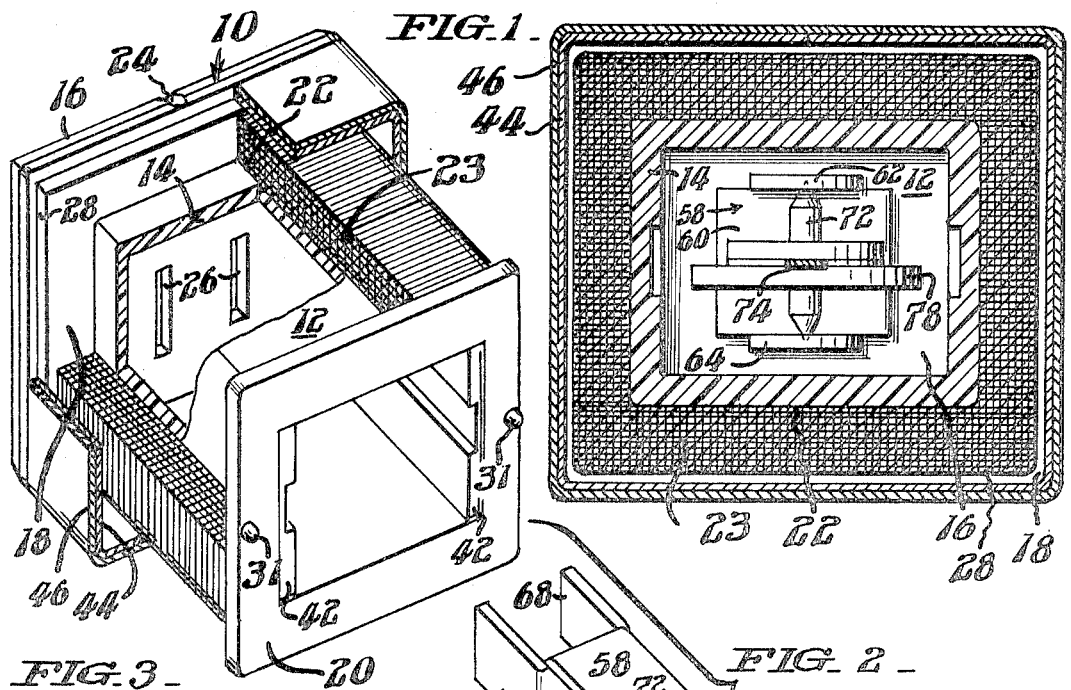

FABRICATION TECHNIQUE FOR ELECTRICAL DEVICES

This application is a divisional application of Ser. No. 563,001, now U.S. Pat. No. 3,510,773.

A principal object of the invention is to provide an indicator which may be made so small in size as to be suitable for use where space is at a premium, as in the field of computers and the field of portable appliances, where high-density packaging of electronic components is essential.

It is known to employ the main housing of an indicator of the type aforesaid as the bobbin for the coil. However, this arrangement has not proved to be entirely satisfactory, because it requires assembly of the movement and the housing before the coil is wound upon the housing, in consequence of which the movement is rotated with the housing or bobbin in a winding machine while the coil is being wound. Thus the delicate movement may be damaged by centrifugal force. Accordingly, another object of the invention is to provide such an indicator with a housing which also serves as the bobbin for the coil, which coil may be wound upon the bobbin before the movement is assembled in the housing, thereby making it unnecessary to revolve the entire indicator in a winding machine.

Another object of the invention is to provide a device in which a bracket is secured to the rear wall of the body of the device by crimping two legs of the bracket which extend through the rear wall of the meter in a manner such that the crimp extends into the slots in the rear wall, thereby firmly securing the bracket to the body portion of the meter. Further in accordance with the invention, the legs are each provided with two notches. These notches restrict the area of deformation due to the crimping action. This prevents stresses from traveling to other parts of the bracket which might deform such other parts of the bracket in a manner which would produce an unsatisfactory assembly.

Other objects of the invention will become apparent when the following description is read with reference to the accompanying drawings, in which:

FIG. 1 is a transverse section through the indicator;

FIG. 2 is an exploded perspective view of the indicator;

FIG. 3 is a perspective rear view showing a preliminary stage of assembly;

FIG. 4 is similar to FIG. 3 but shows a more advanced stage of assembly;

FIG. 5 is a perspective view of a reference plate;

Figure 7:
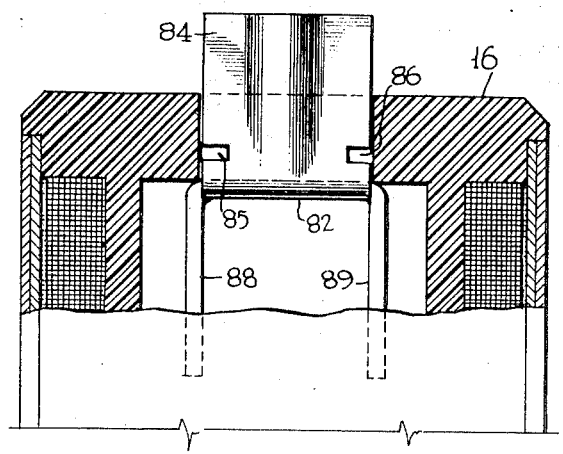
FIGS. 7 and 8 show the modified movement bracket in place in the meter.

The following description is directed to the specific form of the invention illustrated in the drawings and is not intended to be addressed to the scope of the invention itself, which may be practiced in other forms. The following detailed description can best be understood with reference to FIG. 2.

An electric current indicator constructed in accordance with the invention comprises a housing, generally designated 10, including a bobbin 12, preferably molded of a single body of plastic material, for example, plexiglas. The main body of the bobbin in tubular in form and rectangular in transverse section. At one end of the main body 14 is a rear wall 16 closing the same and providing a peripheral flange 18 extending about the main body 14. At the opposite end of the main body 14 is a flange 20 extending about the main body 14. Between the flanges 18 and 20 is a channel 22 extending about the main body 14 and accommodating a wire coil 23 provided with leads 25 and 27 (FIG. 3) for connection of the indicator in an electric circuit. Extending centrally across the back of the wall 16 is a groove 24, and extending through the wall 16 are a pair of rectangular openings 26 disposed respectively on opposite sides of the groove 24.

The housing 10 also comprises a bezel, generally designated 32, preferably molded of a single body of plastic material, for example, plexiglas. The bezel 32 is provided with an arcuate front wall area 34, flat upper and lower opposite sidewall, 36 and a peripherally extending flange 38 having openings 40 therein for receiving pins 31 formed integral with flange 20. The marginal portions of flanges 20 and 38 afford a recess 30 opposed to a similar recess 28 formed in the flange 18.

Extending about the coil 23 is a shield in the form of a metallic strip 44, which is wrapped in a strip of tape 46. The marginal portions of the strip 44 and tape 46 are seated in the recesses 28 and 30.

Within the housing 10 is a reference plate 48 (FIG. 5) provided with an arcuate section 50 and legs 52 at opposite ends thereof each terminating in a laterally bent portion 54 disposed in a recess 42 formed in the flange 20. The arcuate section 50 is set back from the front wall 34 of the bezel 32, is provided with a recess 55, and is painted in contrasting colors to provide a zero reference mark 56.

Within the housing 10 is a bracket 58 stamped from sheet metal and provided with a main body portion 60, a pair of vertically spaced legs 62 and 64 and a pair of horizontally spaced legs 66 and 68.

The legs 66 and 68 are each crimped, as at 70, so as to afford a longitudinally extending area bent out of the plane of the opposite side marginal portions of the leg. It will be noted that the crimp renders the part of the leg extending beyond the rear wall 16 U-shaped in transverse section, the overall depth of the leg being slightly greater than the width of the opening through which it passes. Thus the legs are securely wedged in the openings through which they pass, as shown.

The bracket comprises an arbor 72 having opposite end portions revolvably seated in the legs 62 and 64. Affixed to the arbor is a pointer 74 which is provided with a hooked end 76 extending through the recess 55 in the arcuate section 50 of the strip 48 and adapted to move back and forth over the arcuate section 50 in the space between the section 50 and the front wall 34 of the bezel 32. Also affixed to the arbor, adjacent to the pointer 74, is a permanent magnet or disc 78.

Lodged in the groove 24, in the back of the wall 16, is a piece of cunife or other permanent magnet wire 80.

In the assembly of the indicator, the arbor 72, pointer 74 and permanent magnet 78 are first assembled and then mounted as a unit in the bracket 58 by seating the pointed ends of the arbor in suitable depressions formed in the legs 62 and 64. As a separate operation, the bobbin 12 is revolved in a winding machine and wire is wound thereabout to form the coil 23. The ends of the wire are connected to the leads 25 and 27 and brought from the coil through openings, designated 81, in the flange 18.

Now the assembled bracket 58 is inserted as a unit into the bobbin 12, the legs 66 and 68 being projected freely through the openings 26 and then crimped to bend a longitudinally extending area of each leg out of the plane of the opposite side marginal portions of the leg so that the crimp runs into the slot through which the leg extends, causing the leg to become wedged in the plastic to make a rigid connection.

The reference plate 48 is then positioned with the hooked end of the pointer 74 extending through the recess 55 and overhanging the arcuate section 50. The laterally bent portions 54 of the plate 48 are disposed in the recess 42. Then the bezel 32 is positioned with the holes 40 thereof receiving the pins 31, whereupon the contacting surfaces, wet with a solvent, provide a welded plastic joint.

The bobbin 12 is wrapped with the shield 44 and with tape 46.

Then the permanent magnet wire 80 is lodged in the groove 24 and suitably positioned by shifting it longitudinally to get a zero reading. When the wire is centered the poles have equal influence on the disc 78 so that there is no predominating attraction of the rotor to either pole of the wire. By shifting the wire in the groove 24, the pole closest to the shield in effect becomes an adjustable magnetic ground and its influence on the disc 78 can be varied. At the same time, the influence on the disc 78 of the other pole is oppositely affected. Therefore, one side of the disc 78 is repelled while the other is attracted. Thus the pointer is zeroed.

When the indicator is connected in an electric circuit and the circuit energized, the flux of the coil 23 reacts with that of the disc 78 and the pointer 74 is actuated against the influence of the magnet wire 80, swinging to one side or the other of the zero reference mark 56, depending upon the direction of current flow.

It will be noted that the main housing also serves as the bobbin for the holding coil. While this feature is generally old, according to the present invention the coil may be wound separately, that is, the pointer and movement need not be inside the bobbin while the bobbin is being revolved in the winding machine. Thus there is no danger of damaging the delicate movement by centrifugal force during the winding operation. Also, if the movement proves to be defective, it can be replaced without throwing the whole assembly away.

It will also be noted that the bracket takes up a minimum amount of critical space inside the bobbin, which critical space is the space that, if occupied, would adversely affect the coupling efficiency between the magnetic parts.

In addition, it will be noted that the movement is staked in position by crimping in a special manner—a new concept for fastening metal parts to plastic bodies. There is no strain or distortion of the parts. If need should arise, the bracket can be removed with simple tools. No hammer blow is needed and no torque is applied to any of the parts.

It will also be noted that the means for adjusting moving magnet instruments requires practically no space.

As noted hereinbefore, the teaching of this invention provides means for devising an indicator which can be made in such small size as to be useful in a situation where space is at a high premium. The normal size of an indicator made in accordance with the invention is in the order of approximately ⅜ of an inch by ⅝ of an inch in transverse section and ½ of an inch in length. If desired, however, the indicator may be made smaller.

It has been found that when a bracket of the type 58 shown in FIG. 2 has its legs crimped to secure it to the housing, the crimping stresses often extend to the second pair of arms 62 and 64, thereby distorting their position and sometimes to an extent which unseats the arbor 72 from its mounting between the arms. The modified bracket shown in FIG. 6 prevents this distortion.

Figure 6:
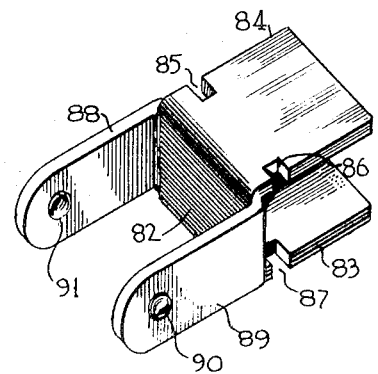
FIG. 6 shows a modified movement bracket.

Referring now to FIG. 6, there is shown a modification of the bracket 58. The modification shown in FIG. 6 has notches in the legs, which extend through the rear wall of the meter to relieve the tension caused by the crimping of the outer portions of legs 83 and 84.

The bracket shown in FIG. 6 includes a body portion 82 and a first pair of legs 83 and 84, extending therefrom, as in the previous embodiment. However, in this embodiment, the leg 84 has notches 85 and 85 and the leg 83 has two similar notches, only the notch 87 being shown.

The bracket shown in FIG. 6 has a second pair of legs 88 and 89, which have been indented at 90 and 91 to receive the arbor. The bracket of FIG. 6 is shown in place in the housing in FIGS. 7 and 8. These Figures depict a portion of the rear wall 16 with the bracket of FIG. 6 in place in the slots therein.

Figure 8:
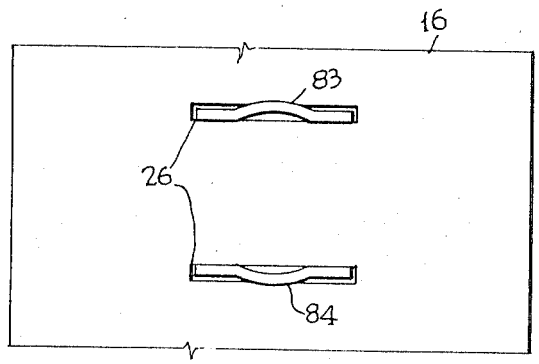

When a bracket of the type shown in FIG. 6 is used, the crimping stresses may travel no further than the slots or notches 85, 86 and 87, and in any event so minimizes the stresses transmitted to the second pair of legs 88 and 89, as to prevent their change of position. Hence there is avoided the problem of an unduly loose arbor as well as the possibility of the unseating of the arbor which has previously been mounted between legs 88 and 89. The use of a bracket such as that shown in FIG. 6 minimizes the number of rejects which result from the crimping operations. FIGS. 7 and 8 show the modified bracket in place in a meter of the type previously described.

Figure 9:
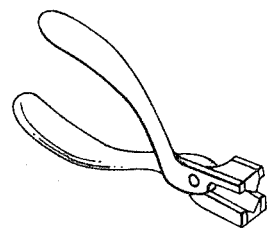
FIG. 9 shows a crimping tool of one type which may be used in the crimping operation of this invention.

FIG. 9 shows one type of crimping tool which may be used to make the crimp 70 in each of the legs 66 and 68. The leg is pressed between the teeth of the tool, one of which has a concave surface and one of which has a convex surface. When pressure is applied to the tool, the sheet metal will be deformed between the teeth of the tool and, most importantly, the deformation introduced in this manner will travel along the legs into the slots 26 of the main body portion. In this manner, the legs will be wedged securely in the slots 26.

Figure 10:
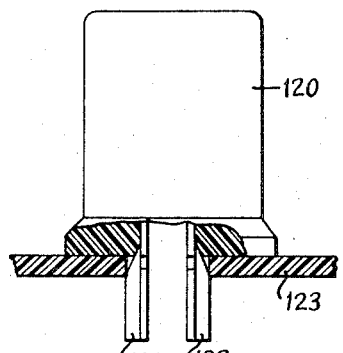
FIGS. 10 and 11 are a front elevation and a partial bottom view of an electrical component assembled in accordance with the present invention.
Figure 11:
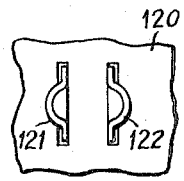

FIGS. 10 and 11 depict another type of device to which the crimping technique of this invention has application. There is shown in FIG. 10 a capacitor 120 having two electrical leads 121 and 122. These electrical leads are formed of sheet metal in a manner similar to the legs of the bracket previously described. The leads 121 and 122 are inserted through slots in the mounting board 123. The leads are then crimped, as previously described, to securely fasten the capacitor 120 to the mounting board 123.

While particular embodiments of the invention have been shown and described, it will, of course, be understood that various modifications may be made without departing from the principles of the invention. The appended claims are, therefore, intended to cover any such modification within the true spirit and scope of the invention.

I claim:

1. The combination comprising:
   a housing having at least one slot in a wall thereof,
   a sheet metal bracket having a body portion and at least one leg disposed in a plane extending from said body portion, said bracket being positioned in said housing with said body portion being disposed against said wall with said leg extending through in closely fitting relationship with said slot, and
   each said leg being of substantially uniform width and in the region extending outwardly of said wall of said housing being crimped to define an arcuate deformed portion which uniformly extends inwardly into the slot through which said leg extends and into locking relationship with the wall of said slot to hold said body portion against the inner surface of said wall and in fixed position in said housing the width and elevation of said arcuate portion decreasing uniformly from the free end of each leg toward said body portion.

2. The combination recited in claim 1, and
   a pair of notches in opposite sides of each said leg, said notches limiting the deformation of said leg so that said deformation does not extend to said body portion.

3. Sheet metal fastening means for securing together two mechanical elements, a first of said elements having a slot, the second of said elements having a body portion and a leg portion of substantially uniform width extending through said slot in closely fitting relationship therewith, the leg portion extending outwardly from said second element and having a portion thereof being deformed lengthwise thereof being deformed lengthwise thereof into an arcuate shape, the arcuate deformed portion extending from an enlarged section outside the wall of said first element and extending uniformly to a narrow tapered section within said slot, the uniform tapered section of said deformed portion providing a locking relationship with a wall of said slot the width and elevation of said arcuate portion decreasing uniformly from the free end of each leg toward said body portion.

4. The sheet metal fastening means of claim 3 in which
   said second element is provided with a first pair of legs extending from opposite ends of a flat body portion, and in which
   said first pair of legs have identical deformed portions for applying uniformly to said pair of legs tensional forces urging said flat body portion of said second element tightly against said first element.

5. The combination comprising:
   means including a wall of plastic material,
   a sheet metal bracket having a main body portion abutting said wall, and means rigidly securing said bracket so said wall including:
a pair of laterally spaced legs each of substantially uniform width extending from said bracket main body respectively through a pair of openings in said wall and projecting a substantial distance therebeyond,
the portion of each leg extending beyond said wall having a portion crimped to form a longitudinally extending channel projecting into the associated opening, said channel extending from an enlarged section beyond said wall and extending uniformly to a narrow tapered section within said opening, the uniform tapered section of said channel providing a locking relationship with said plastic material whereby said legs bite into said plastic material and become wedged in said openings for securing said bracket to said wall the width and elevation of said channel portion decreasing uniformly from the free end of each leg toward said main body.

6. Sheet metal fastening means for securing together two mechanical elements,
a first of said elements having two parallel slots,
the second of said elements having a body portion and a first pair of legs extending through said slots in closely fitting relationship therewith, a second pair of legs extending from said body portions in directions parallel one to the other and in planes normal to the planes of which said first pair of legs extend, said first pair of legs extending outwardly from aid body portion being deformed lengthwise thereof into an arcuate shape, the arcuate deformed portions extending inwardly of said slots into locking relationship with a wall of said slots, and
means for preventing distortion of said second pair of legs by the deformation of said first pair of legs comprising inwardly extending slots in each of said first pair of legs located in the vicinity of said body portion for minimizing the application of said forces to said second pair of legs during deformation of said first pair of legs.

\* \* \* \* \*